United States Patent [19]
Fowler

[11] 4,352,538
[45] Oct. 5, 1982

[54] LOW PROFILE CONNECTOR FOR PRINTED CIRCUIT BOARD

[75] Inventor: Charles E. Fowler, Boardman, Ohio

[73] Assignee: General Motors Corporation, Detroit, Mich.

[21] Appl. No.: 151,308

[22] Filed: May 19, 1980

[51] Int. Cl.[3] .......... H01R 11/20; H02B 1/04
[52] U.S. Cl. .......... 339/126 R; 339/97 P
[58] Field of Search .......... 339/97 R, 99 R, 97 P, 339/98, 107, 126 R, 127 R, 127 C, 176 MP, 217 S, 99 R, 128, 209

[56] References Cited

U.S. PATENT DOCUMENTS

| | | | |
|---|---|---|---|
| 3,189,863 | 6/1965 | Leach | 339/99 |
| 3,235,833 | 2/1966 | Elm | 339/97 |
| 3,277,425 | 10/1966 | Marshall et al. | 339/217 S X |
| 3,365,694 | 1/1968 | Parker | 339/17 |
| 3,718,888 | 2/1973 | Pasternak | 339/98 |
| 3,760,335 | 9/1973 | Roberts | 339/99 R |
| 3,820,058 | 6/1974 | Friend | 339/99 R |
| 4,066,325 | 1/1978 | Pearce, Jr. | 339/176 MP |
| 4,174,877 | 11/1979 | Foederer | 339/97 P |
| 4,255,009 | 3/1981 | Clark | 339/99 RX |

*Primary Examiner*—Joseph H. McGlynn
*Assistant Examiner*—John S. Brown
*Attorney, Agent, or Firm*—F. J. Fodale

[57] ABSTRACT

A low profile connector for a printed circuit board is attached to the insulated conductor wires of a wiring harness passive between a connector body and a cover. The terminals have contact bows attached to the leading edges of channel-shaped portions which mount the terminals on ribs in the terminal cavities. The channel-shaped portions have projecting tails under the cover which have aligned slots for making electrical and mechanical connections with the insulated conductor wires. The connector includes a strain relief feature and a panel mounting feature.

2 Claims, 5 Drawing Figures

LOW PROFILE CONNECTOR FOR PRINTED CIRCUIT BOARD

This invention relates generally to an electrical connector and, more particularly, to an electrical connector for a printed circuit board.

U.S. Pat. No. 4,066,325 granted to Warren Pearce, Jr. and Andrew Russo, Jr. on Jan. 3, 1978 discloses an electrical connector for a printed circuit board which is typical of designs used in automotive wiring systems. Typically these connectors comprise a slotted connector body which contains two rows of terminals, each of which is crimped to an end of one of the insulated wire conductors of the wiring harness.

It is also known from U.S. Pat. No. 3,760,335 granted to Lincoln Edwin Roberts on Sept. 18, 1973 to provide an electrical connector having terminals which include slotted portions at one end which receive the ends of the insulated wire conductors to form electrical and mechanical connections between the terminals and the insulated wire conductors.

In its broadest aspect, the object of this invention is to provide an electrical connector for a printed circuit board in which the terminals have slotted portions for receiving conductors to form electrical and mechanical connections between the terminals and the insulated wire conductors.

Another object of this invention is to provide an electrical connector for a printed circuit board which may be attached anywhere along the length of the wiring harness.

Another object of this invention is to provide an electrical connector for a printed circuit board which is attached perpendicularly to the wiring harness and which has a very low profile or height in the perpendicular direction.

A feature of the invention is that the terminals have a very short length to reduce the height requirements of the connector.

Another feature of the invention is that the terminal cavities are staggered to reduce the lateral spacing required between the insulated wire conductors to which the connector is attached.

Yet another feature of the invention is that the connector has an attached cover which provides a strain relief between the terminals and the insulated wire conductors.

Still another feature of the invention is a unique panel mounting feature which may be incorporated in the connector body of the connector.

Other objects and features of the invention will become apparent to those skilled in the art as the disclosure is made in the following detailed description of a preferred embodiment of the invention as illustrated in the accompanying sheets of drawing in which.

Figure 1:
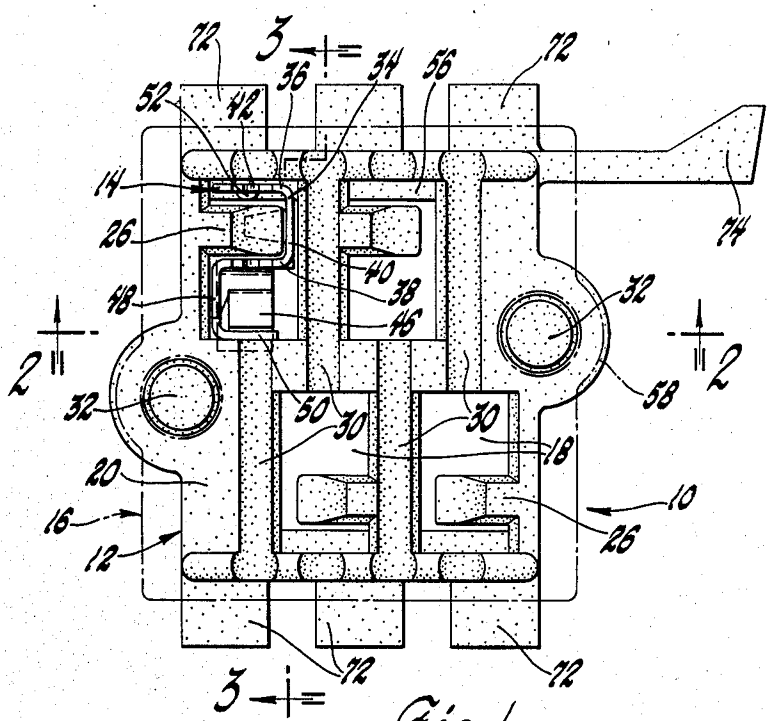
FIG. 1 is a top view of an electrical connector in accordance with the invention.

Referring now to the drawing, the electrical connector 10 comprises a connector body 12, a plurality of terminals 14 and a cover 16.

Figure 4:
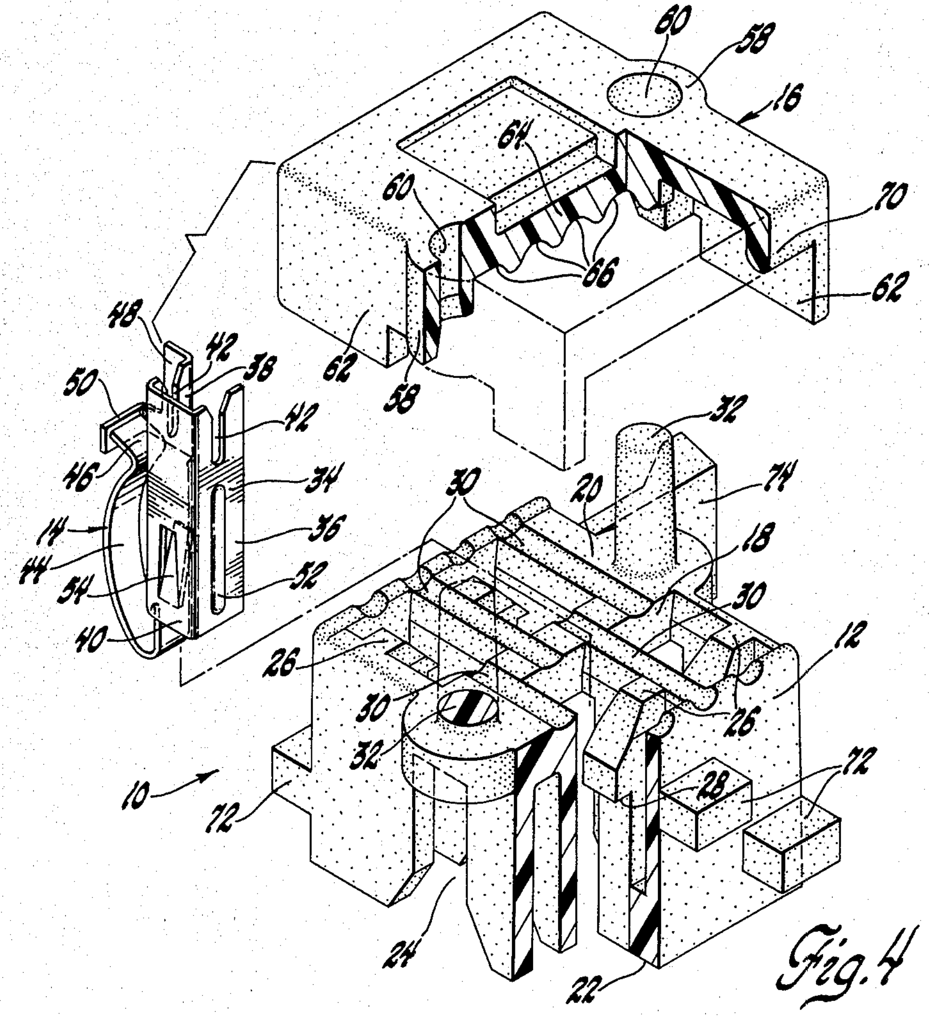
FIG. 4 is an exploded, partially sectioned perspective view of the electrical connector shown in FIGS. 1, 2 and 3.

The connector body 12 has four terminal cavities 18 which extend through the connector body 12 from a conductor end 20 to a contact end 22. The cavities 18 are arranged in two rows which are on opposite sides of a lateral slot 24 in the contact end 22 of the connector body for receiving a printed circuit board. The cavities in the row on one side of the slot 24 are staggered from the cavities on the opposite side as shown in FIGS. 1 and 4. This staggered relationship permits the connector 10 to be attached to four coplanar insulated wire conductors which are spaced close together as will hereinafter more fully appear.

Each of the cavities 18 communicates with the lateral slot 24 and each of the cavities 18 has a support rib 26 which is parallel to the depth of the slot 24 and which projects from a cavity side wall. Each support rib 26 includes a latch shoulder 28 which faces the contact end 22 of the connector body 12.

The connector body 12 has four parallel grooves 30 which extend across the conductor end 20 in a direction transverse to the slot 24. Each of the grooves 30 is interrupted by one of the cavities 18. The grooves cooperate with the cover 16 to properly locate the insulated conductor wires connected to the terminals 14 disposed in the cavities 18.

The conductor end 20 of the connector body 12 also has two integral posts 32 for securing the cover 16.

Figure 2:
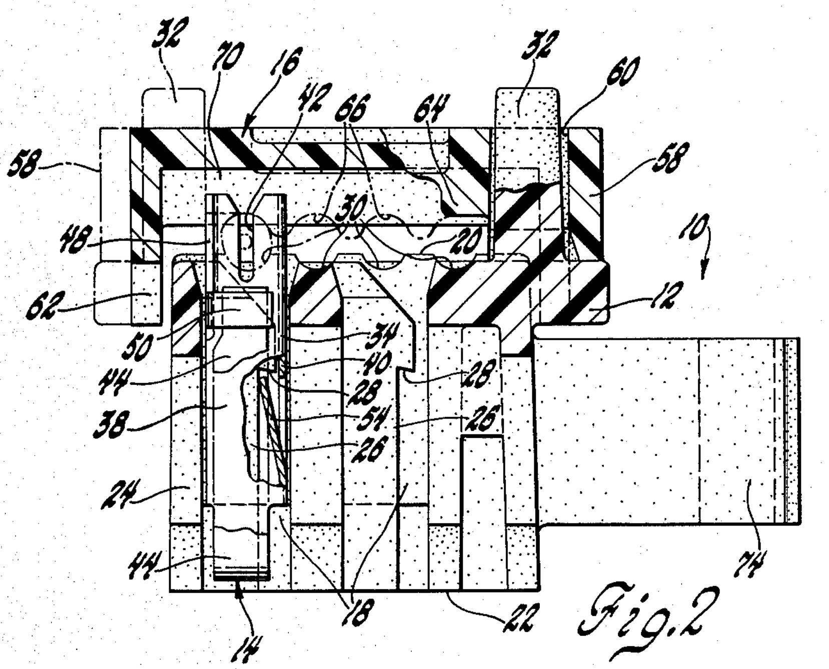
FIG. 2 is a section taken substantially along the line 2—2 of FIG. 1, looking in the direction of the arrows.
Figure 3:
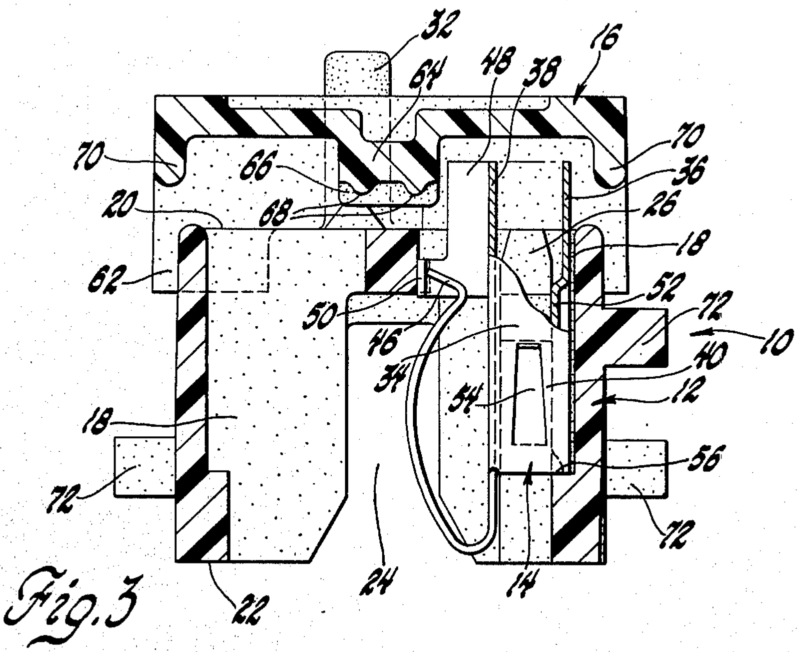
FIG. 3 is a section taken substantially along the line 3—3 of FIG. 1, looking in the direction of the arrows.

Each of the terminals 14 is of unitary sheet metal construction and comprises a channel-shaped body portion 34 which mounts the terminal on the support rib 26 in one of the terminal cavities 18. The body portion 34 has two spaced parallel walls 36, 38 connected by a web 40. The parallel walls 36, 38 each have aligned slots 42 in their tail ends for receiving one of the insulated lead wires. When the terminals 14 are properly positioned in the cavities 18, the slotted tail ends project outwardly of the connector body 12 and the aligned slots 42 in each terminal are aligned with one of the grooves 30 as shown in FIG. 2.

Each of the terminals 14 have a contact bow 44 which is integrally attached to the leading edge of the wall 38 by a nose radius so that the contact bow 44 is outside and next to the channel-shaped body 34. This minimizes the length of the terminal while providing the requisite flexibility for the contact bow 44. The contact bow 44 terminates in an upturned foot 46 which is located within the terminal cavity behind the slot 24. The wall 38 has an outward flange 48 at its tail end which is connected at the side edge opposite the web 40. The flange 49 has a bent tab 50 which overlies the foot 46 to protect the contact bow 44 from being pried up during handling.

The wall 36 has a depressed longitudinal rib 52 for increased strength and adjusting the spacing between the parallel walls 36 and 38 so that the terminal is firmly mounted on the support rib 26 in the terminal cavity. The web 40 connecting the walls 36 and 38 has a lanced and inwardly bent latch tang 54.

The terminals 14 are inserted into the terminal cavities 18 through the openings at the conductor end 20, with the support ribs 26 being received in the channel-shaped bodies 34. The terminals 14 are retained in the cavities 18 by the latch tangs 54 engaging the latch shoulders 28. Over insertion is prevented by the leading edge of the wall 36 engaging stop shoulders 56 at the contact end 22 of the connector body 12.

When the terminals 14 are properly positioned in the connector body 12, the slotted tail ends of the terminals project outwardly of the conductor end 20 of the connector body 12. An insulated lead wire is then pushed into the aligned slots 42 in each terminal until the wires rest in the grooves 30 associated with the terminal cavities as shown in FIG. 2. The width of the slots 42 is slightly less than the diameter of the conductor core. The slots 42 pierce the insulation and make a mechanical and electrical connection between the conductor wire and the terminal in a well-known manner.

After the four insulated conductor wires are attached to the terminals 14, the cover 16 is placed over the conductor end 20 of the connector body 12.

The cover 16 has two depending bosses 58 around holes 60 which receive the posts 32 and depending flanges 62, on two sides which merge with the bosses 58. The flanges 62 extend below the bosses 58 and overlap the connector body 12 when the cover 16 is secured.

The inside of the cover 16 has a central rib 64 which extends between the bosses 58. This rib has four parallel grooves 66 which align with the grooves 30 in the connector body 12 and engage the oppsite sides of the insulated conductor wires. Each of the grooves 66 has two chordal ribs 68 which embed in the insulation of the conductor wires when the cover is secured to provide a strain relief. The cover 16 has short flanges 70 on the other two sides. These flanges are spaced from the conductor end 20 of the connector body 12 to permit the insulated lead wires to pass between the connector body 12 and the cover 16.

The cover 16 is secured to the connector body 12 by heat staking or otherwise suitably deforming the tops of the posts 32.

The connector 10 also includes a panel mounting feature which comprises six lugs 72, three of which project from each of two opposite side walls of the connector body 12. The four outside lugs are coplanar and are near the contact end 22 of the connector body 12. The two middle lugs are coplanar and spaced from the four outside lugs toward the conductor end 20. The spacing is equal to the thickness of the panel to which the connector 10 is to be mounted.

The panel mounting feature also includes a latch finger 74 which projects from a third side of the connector body 12. The width of the finger 74 is wide enough to span the space between the four outside lugs and two middle lugs 72 and preferably spans the thickness of the lugs as well so that the edge can be gripped when the connector 10 is mounted on a panel.

Figure 5:
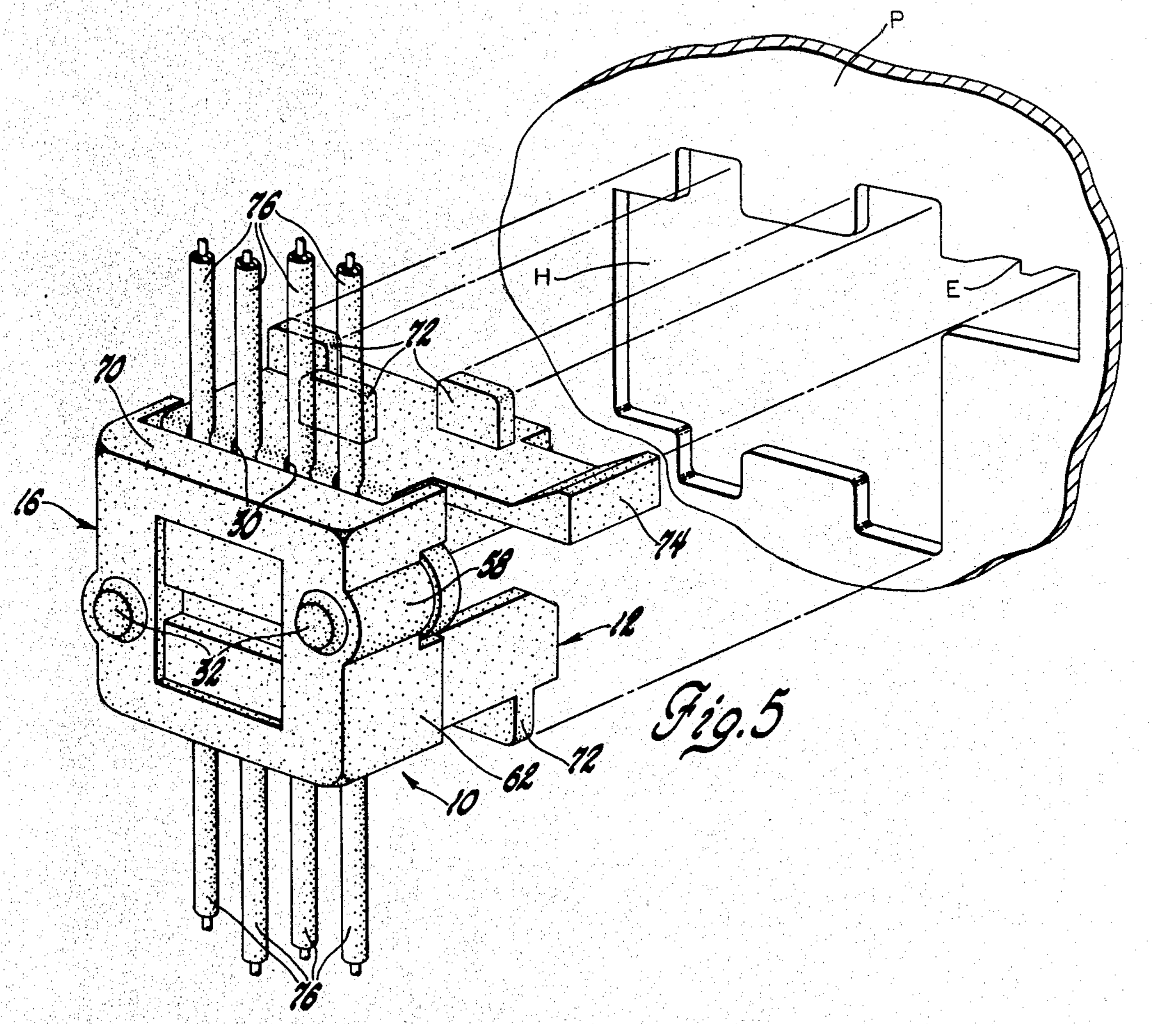
FIG. 5 is a perspective view of the electrical connector attached to a wiring harness in the process of being assembled to a mounting panel.

FIG. 5 shows the electrical connector 10 which is attached to four insulated lead wires 76 of a wiring harness and which is in the process of being assembled to a mounting panel P. The mounting panel P has a hole H which matches the outline of the connector body 12 in the plane of the four outside lugs 72. To mount the connector 10 to the panel P, the connector body 12 is inserted into the hole H until the two middle lugs engage the panel face. The connector 10 is then slid to the left on the panel P against the left edge of the hole H moving the outside lugs behind solid portions of the panel. The connector 10 is retained in this position by the latch finger 74 engaging a latch edge E in the panel hole H.

I wish it to be understood that I do not desire to be limited to the exact details of construction shown and described, for obvious modifications will occur to a person skilled in the art.

The embodiments of the invention in which an exclusive property or privilege is claimed are defined as follows:

1. A low profile connector for a printed circuit board comprising:
   - a connector body having two spaced rows of terminal cavities which extend from a conductor end to a contact end thereof,
   - a transverse slot in the contact end for receiving a printed circuit board,
   - said transverse slot being between the two rows of terminal cavities and communicating with each of the terminal cavities,
   - a support rib in each terminal cavity which is parallel to the depth of the slot and which projects from a side wall transverse to the slot,
   - a terminal disposed in each cavity having a contact bow projecting into the slot,
   - said terminal further including a channel-shaped body having spaced parallel walls located on opposite sides of the support rib,
   - said contact bow being connected to a leading edge of one of said walls by a reverse bend,
   - at least one of said walls having a tail portion projecting outwardly of the conductor end of the connector body, said tail portion having a slot for receiving an insulated conductor wire and piercing its insulation to make electrical contact with its core,
   - a cover over the conductor end of the connector body for covering the tail portions after the conductor wires are received in the slots, and
   - panel mounting means comprising:
     - a first set of lugs projecting from one side of the connector body,
     - a second set of lugs projecting from an opposite side of the connector body, and
     - a latch finger projecting from a third side of the connector body,
     - said first and second sets each having at least one lug spaced from the remaining lugs so that the lugs in each set are adapted to engage opposite sides of a panel, and
     - said latch finger being wide enough to span the space between the lugs in each set.

2. Panel mounting means for a low profile electrical connector including a connector body comprising:
   - a first set of lugs projecting from one side of the connector body,
   - a second set of lugs projecting from an opposite side of the connector body, and
   - a latch finger projecting from a third side of the connector body,
   - said first and second sets each having at least one lug spaced from the remaining lugs so that the lugs in each set are adapted to engage opposite sides of a panel, and
   - said latch finger being wide enough to span the space between the lugs in each set.

* * * * *